United States Patent [19]

Uchman

[11] Patent Number: 5,033,167
[45] Date of Patent: Jul. 23, 1991

[54] LOW PROFILE CLAMP

[75] Inventor: Frederick J. Uchman, Clarkston, Mich.

[73] Assignee: GKN Automotive Inc., Auburn Hills, Mich.

[21] Appl. No.: 552,247

[22] Filed: Jul. 12, 1990

[51] Int. Cl.$^5$ ............................................. B65D 63/02
[52] U.S. Cl. .............................. 24/20 R; 24/200 CW; 24/20 EE; 24/23 EE
[58] Field of Search ............ 24/20 R, 20 CW, 20 EE, 24/20 TT, 20 W, 23 W, 23 EE

[56] References Cited

U.S. PATENT DOCUMENTS

| | | | |
|---|---|---|---|
| 1,483,714 | 2/1924 | Brooks | 24/23 W |
| 3,295,176 | 1/1967 | Bright | 24/20 CW |
| 4,237,584 | 12/1980 | Oetiker | 24/23 EE |
| 4,430,775 | 2/1984 | Arthur | 24/20 EE |
| 4,742,600 | 5/1988 | Calmettes et al. | 24/20 R |
| 4,802,261 | 2/1989 | Mizukoshi et al. | 24/20 R |

Primary Examiner—Victor N. Sakran

[57] ABSTRACT

A clamping device for clamping a hose, boot or the like to a cylindrical-shaped structure is disclosed. The clamping device is a clamping band having a body portion, an underlap end having a pair of hooks adjacent thereto, an overlap end having a pair of shoulders adjacent thereto for engaging the pair of hooks, and a clasp for binding the overlapped portion of the clamping band adjacent the overlap end. The overlap end is elevated above the body portion of the clamping band so as to accommodate the underlap end therebelow. As a result, no gap beneath the clamping band is formed where the overlap end extends radially outward to overlap the underlap end. Further, the profile of the clamping band is limited to four thicknesses of the body portion outside the perimeter of the hose or boot.

28 Claims, 2 Drawing Sheets

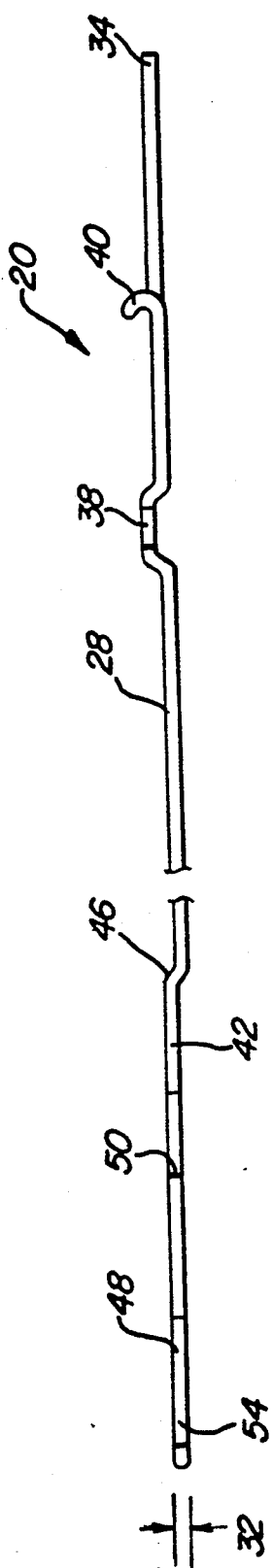
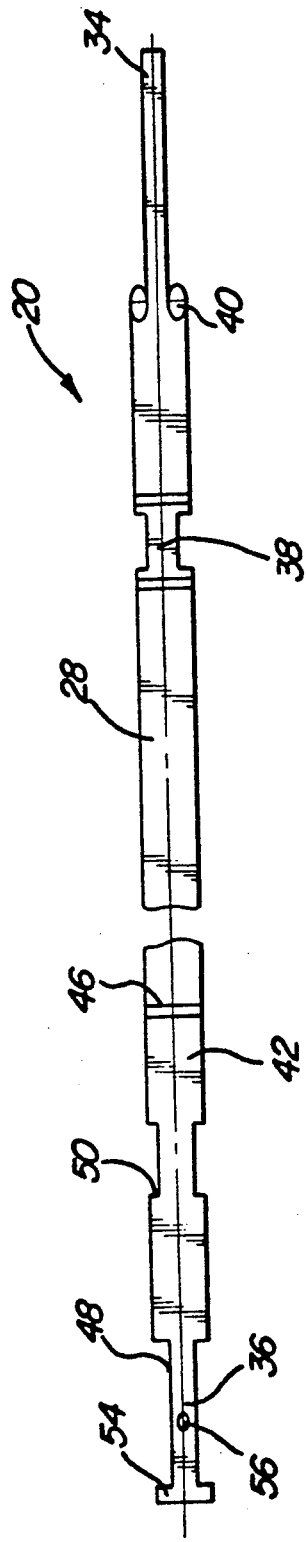
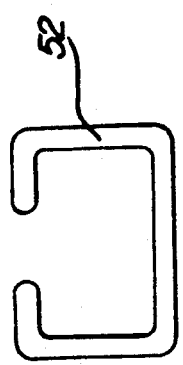

LOW PROFILE CLAMP

BACKGROUND OF THE INVENTION

1. Field of the Invention

The present invention generally relates to a clamp used to secure hoses, boots or similar structures around a cooperating structure. More specifically, this invention relates to a low profile clamp which is particularly adapted to clamp a boot to the hub of a constant velocity joint having a restricted space within which the clamp must reside and where the lubricant contained within the boot tends to be forced outward between the boot and the hub due to the high centrifugal forces associated with a constant velocity joint.

2. Description of the Prior Art

Clamping devices such as clamping bands are well known in the art and are extensively used to secure hoses, boots and the like to cylindrically-shaped members. Clamping bands generally include a body portion having oppositely disposed ends which may or may not overlap each other, and means for securing the ends or the overlapping portions of the clamping band together to retain the clamping band on the hose or boot. Typically the clamping band serves to seal the hose or boot against the cylindrical member to prevent escape of any fluid contained therein, and further to ensure that the hose or boot is securely retained on the cylindrical member.

A common problem with clamping bands is the limited space in which the device must reside. Also, for certain reasons pertaining to mechanical dynamics it may be undesirable for portions of the device to project too far outside the perimeter of the hose or boot. One approach to limiting these undesirable consequences is disclosed in U.S. Pat. No. 4,802,261 to Mizukoshi et al. There, the opposing free ends and of the band body overlap each other. Within the region of the overlapping free end there is provided an aperture having a projection extending radially downward toward the overlapped free end. On the overlapped free end is a series of radially upwardly extending projections for cooperating with the projection to retain the band body in a clamping position around a body to be clamped. A pair of bent portions is welded to the underside of the overlapped free end. The bent portions act to maintain engagement between the projection and one of the series of projections. The overall thickness of the band body is, therefore, at a maximum at the bent portions. The combined thicknesses of the overlapping and overlapped free ends plus the thickness of the bent portions passing below the overlapped free end and passing above the overlapping free end result in a total of four thicknesses.

A shortcoming of the clamping band disclosed by Mizukoshi et al is the radial gap created at the point where the free ends begin to overlap each other. The gap tends to extend along a significant portion of the circumference of the clamp, reducing the clamping effect of the band body 10 on the clamped body 54 in that region. Thus, a path is provided that will allow leakage of fluid contained within the hose or boot if the fluid is under high pressure or if it experiences localized pooling due to internal or external dynamic forces.

To avoid this shortcoming, U.S. Pat. No. 4,237,584 to Oetiker expressly teaches away from the use of overlapping ends in the design of a clamping band. There, the opposing ends of the clamping band are formed to fit together in a tongue-and-fork fashion. The method of maintaining a clamping action is accomplished by providing a clamping member to the clamping band. The clamping member has a series of teeth which engage a series of cut-out portions that are disposed adjacent each end of the clamping band. What is commonly referred to as an "Oetiker ear" is centrally disposed on the clamping member between sets of teeth. To draw the clamping band tight around the member to be clamped, the ear is contracted to draw the series of teeth toward the ear, pulling the ends of the clamping band together.

A primary disadvantage to the Oetiker clamping band is the projection of the ear above the perimeter of the clamping band. In applications where space is at a premium or where adverse effects may result from a non-symmetrical construction, the ear presents a major shortcoming.

From the above discussion, it can be readily appreciated that the prior art does not teach a clamping band which simultaneously minimizes the gap created by the overlapping ends of the band while providing a low profile.

Therefore, it would be desirable to provide a clamping band with the advantages of a clamping band having overlapping ends because of its ability to provide a low profile. It would be additionally desirable to provide a clamping band which simultaneously minimizes any gap created by the overlapping ends. As taught by Oetiker, it is not economically feasible to minimize the gap created by overlapping ends by grinding the overlapped end to be thinner because of the added costs of the grinding step and the undesirable compromises required in selecting a band material that can be readily ground.

Accordingly, what is needed is a clamping band which employs overlapping ends thereby facilitating a low profile of the clamping band, while also providing unique features that minimize the gap created by the overlap.

SUMMARY OF THE INVENTION

According to the present invention there is provided a clamping system having a member, such as a boot, which is to be clamped to a cylindrically-shaped surface, such as the hub of a constant velocity joint, and a clamping band for clamping the boot around the hub. The clamping band has a body portion, a cooperating pair of features for hooking overlapping portions of the clamping band as it overlaps itself, and a clasp for binding another pair of overlapping portions of the clamping band.

In practice, the body portion circumscribes the boot, thereby defining a diameter. The body portion has an underlap end and an oppositely disposed overlap end. Adjacent the underlap end is a first clasp segment. The first clasp segment is radially elevated above the diameter defined by the body portion as it circumscribes the boot. One of the cooperating pair of hooking features is positioned adjacent the first clasp segment.

Adjacent the overlap end is an overlap segment. The overlap segment is radially elevated above the diameter of the body portion, similar in manner to the first clasp segment. When the body portion circumscribes the boot, the overlap segment overlaps the oppositely disposed underlap end. A second clasp segment is disposed on the overlap segment and adjacent the overlap end such that the second clasp segment overlaps the first clasp segment, much the same as the overlap end overlaps the underlap end.

Disposed on the overlap segment and adjacent the second clasp segment is the other half of the cooperating pair of hooking features. As the body portion circumscribes the boot, the cooperating pair of hooking features engage each other, retaining the body portion on the boot in its circumscribing position.

The clasp is positioned around the first and second clasp segments as they reside in their overlapping positions. The clasp secures the first and second clasp segments together, further assisting the cooperating pair of hooking features in retaining the body portion around the boot. The clasp also ensures that the cooperating pair of hooking features remain engaged with one another. In addition, if the first and second clasp segments are positioned such that they reside adjacent the overlap end, the clasp serves to prevent the overlap end from drifting radially outward.

In use, the clamping system minimizes the extent to which the clamping band projects outside the diameter of the boot by way of minimizing the combined thickness of the clamping band where its members overlap each other. For example, where the overlap and underlap ends overlap each other, the combined thickness is two thicknesses of the body portion. At the clamping band's thickest point where the clasp secures the first and second clasp segments, the combined thickness is no more than four thicknesses—the thickness of the clasp which passes below the first (elevated) clasp segment, plus the combined thicknesses of the first and second clasp segments as they overlap each other, plus any additional thickness resulting from the clasp passing over the second clasp segment.

According to a preferred aspect of this invention, an inventive feature is that, when the clamping band is specially sized for its particular application, the irregularities, or gaps, along the surface of the clamping band against the boot are minimized. The underlap end lies entirely under the elevated overlap segment of the overlap end. As a result, the possibility is reduced that the lubricant contained within the boot will leak between the boot and hub due to high internal boot pressures or, by example, the high centrifugal forces experienced by the constant velocity joint.

In addition, a significant advantage of the present invention is that the clamping band more readily fits within the restricted confines of a constant velocity joint.

Accordingly, it is an object of the present invention to provide a clamping system having a low profile for allowing the clamping system to fit within a restricted space.

It is a further object of this invention that such clamping system minimize the irregularities of the clamping band surface adjacent to the member it is intended to clamp to ensure the integrity and reliable seal between the member to be clamped and the structure to be clamped thereto.

It is still a further object of this invention that there is provided means for securing overlapping portions of the clamping band together for purposes of retaining the clamping band in place around the member to be clamped.

It is yet another object of this invention that there is provided a method for clasping a second pair of overlapping portions together to further ensure the clamping band is retained around the member to be clamped, the clamping band's securing means remain engaged with one another, and further to prevent the radially outward drifting of the overlap end of the clamping band.

Other objects and advantages of this invention will be more apparent after a reading of the following detailed description taken in conjunction with the drawings provided.

BRIEF DESCRIPTION OF THE DRAWINGS

FIG. 3 is a plan view of the clamping band of FIG. 1 in accordance with a preferred embodiment of this invention;

FIG. 4 is a side view of the clamping band of FIG. 3; and

FIG. 5 is a cross-sectional view of the clasp of FIG. 1 in accordance with a preferred embodiment of this invention.

DETAILED DESCRIPTION OF THE PREFERRED EMBODIMENT

Figure 1:
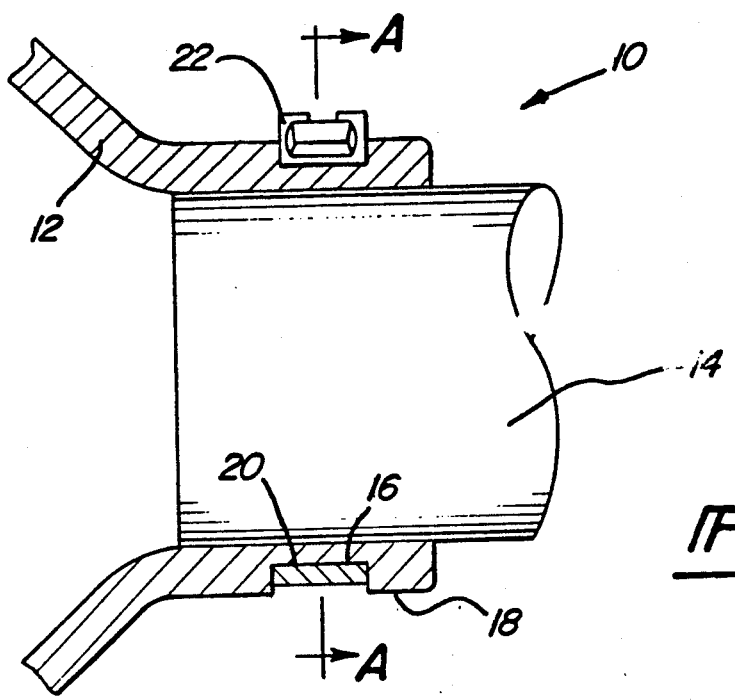
FIG. 1 is a partial cross-sectional view of a clamping system in accordance with a preferred embodiment of this invention.

In a preferred embodiment of this invention, as shown in FIG. 1 a clamping system 10 is provided which is used to clamp an elastic member, such as a boot 12 having a generally annular cross-section, to a cylindrically-shaped surface, such as that found on a hub 14 of a constant velocity joint. The boot 12 may have one or more annular grooves 16 in the region 18 to be clamped for purposes of better securing the clamping system 10 thereon. The clamping system 10 includes a clamping band 20 which circumscribes the boot 12, and a clasp 22 which binds a pair of adjacent portions of the clamping band 20 together.

Figure 2:
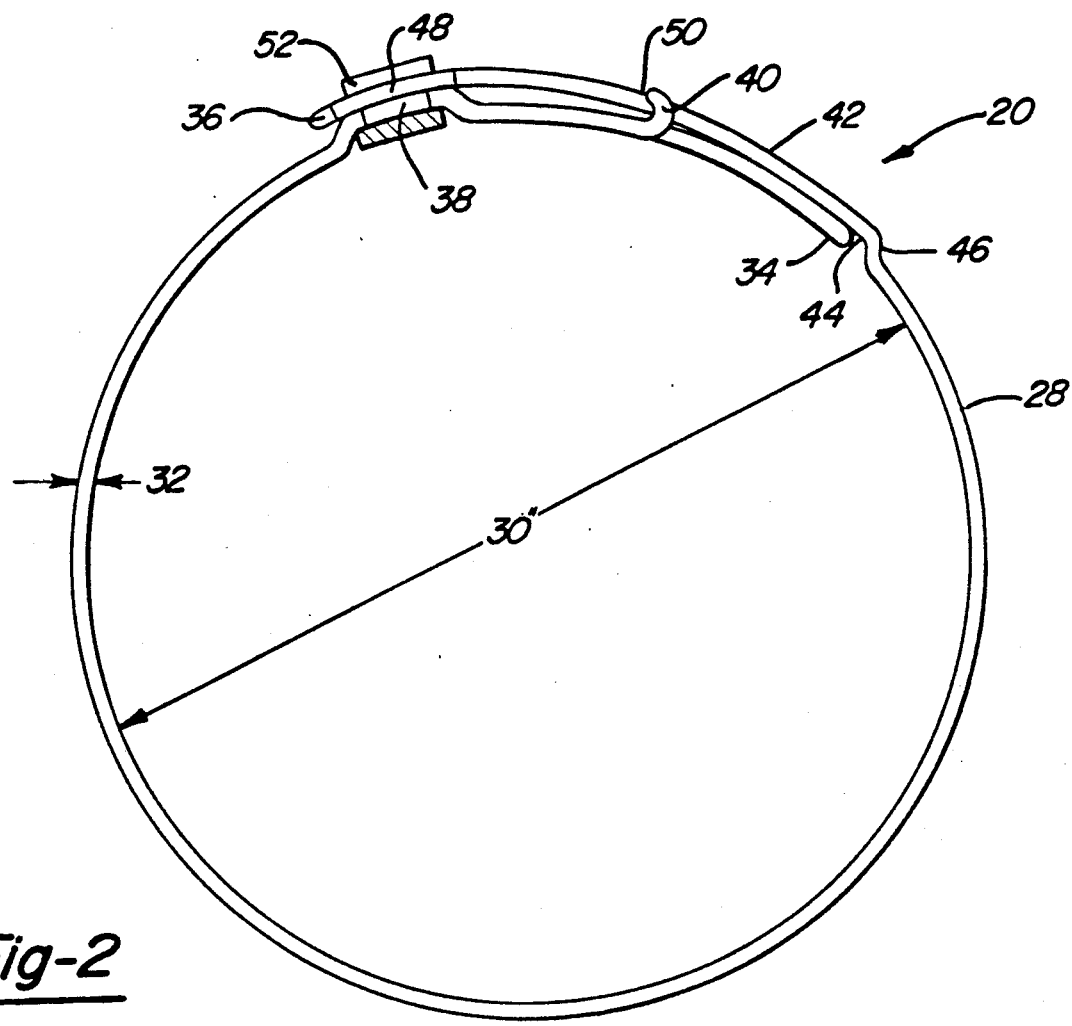
FIG. 2 is a cross-sectional view of the clamping system of FIG. 1 along line A—A.

Referring to FIGS. 1 and 2, the clamping band 20 has a body portion 28 adapted to circumscribe the boot 12 in the region 18 intended to be clamped. The body portion 28 defines a diameter 30 as it circumscribes the boot 12. The body portion 28 has a predetermined width no greater than the annular groove 16, and a predetermined thickness 32 which can vary to fit the requirements of a particular application. A common thickness for purposes of the present invention is approximately 0.65 to 0.70 millimeters. The body portion 28 has an underlap end 34 and an oppositely disposed overlap end 36, the underlap end 34 being narrower than the predetermined width of the body portion 28.

The clamping band 20 also has a first clasp segment 38 which is adjacent to the underlap end 34. The first clasp segment 38 is formed to be narrower than the predetermined width of the body portion 28 and is also formed such that it is elevated a distance of approximately one predetermined thickness 32 above the body portion 28. This feature, along with the layout and relative elevations of the clamping band 20, can also be readily seen in FIG. 3. As a result, the first clasp segment 38 projects outside the diameter 30 by the same distance of approximately one predetermined thickness 32.

A pair of hooks 40 are located between the first clasp segment 38 and the underlap end 34. The hooks 40 are disposed on opposite sides of the predetermined width of the body portion 28, and are generally arcuately formed to radially project a distance of at least one predetermined thickness 32 outside diameter 30.

An overlap segment 42 is disposed on the overlap end 36. The overlap segment 42 is elevated to project a distance of approximately one predetermined thickness 32 outside the diameter 30. In use, the length of the clamping band 20 is such that the overlap segment 42 overlaps the underlap end 34, leaving a minimal gap 44 between the underlap end 34 and a transition portion 46 between the overlap segment 42 and the body portion 28.

A second clasp segment 48 is located on the overlap segment 42 adjacent the overlap end 36. The second clasp segment 48 overlaps the first clasp segment 38 in the same manner that the overlap segment 42 overlaps the underlap end 34. The second clasp segment 48 has a narrower width than the predetermined width of the body portion 28, and is similar in width to the first clasp segment 38.

A pair of shoulders 50 are disposed on the overlap segment 42 adjacent the second clasp segment 48. The pair of shoulders 50 are on opposing sides of the predetermined width similar to the pair of hooks 40 and are formed where the predetermined width of the body portion 28 adjoins the narrower width of the second clasp segment 48. The pair of shoulders 50 cooperate with the pair of hooks 40 to retain the clamping band 20 around the boot 12.

A clasp 52 is crimped to closely fit around both the first clasp segment 38 and second clasp segment 48. The clasp 52 acts to secure the first clasp segment 38 and second clasp segment 48 together, and also ensures that the pair of hooks 40 and the pair of shoulders 50 remain engaged.

The varying width of the clamping band 20 is more clearly illustrated in FIG. 4. As can be seen, the narrower widths of the first and second clasp segments 38 and 48 can be sized such that the width of the clasp 52 when crimped around the first and second clasp segments 38 and 48 never exceeds the predetermined width of the body portion 28, and likewise the width of the annular groove 16.

In addition, FIG. 4 shows a breakaway leg 54 extending from the overlap end 36. The breakaway leg 54 facilitates the installation of the clamping band 20 by providing an appendage for gripping the overlap end 36 and holding it in place while the clasp 52 is crimped around the first and second clasp segments 38 and 48. Upon installation of the clasp 52, the breakaway leg 54 can be readily broken free of the overlap end 36 by positioning a stress riser, such as a hole 56, between the breakaway leg 54 and the overlap end 36. As a result, where the first and second clasp segments 38 and 48 are positioned such that they reside adjacent the breakaway leg 54 on the overlap end 36, the clasp 52 serves to prevent the radially outward drifting or deformation of the overlap end 36 of the clamping band 20.

In a preferred embodiment for use when the enclosure space of the clamping system 10 is at a premium, the combined thickness of the clamping band 20 can be minimized. As readily seen in FIG. 2, a significant advantage of providing the various overlapping portions of the clamping band 20 is to limit the thickness of the clamping band while maintaining sufficient strength to securely clamp the boot 12 to the hub 14. In the present invention, the combined thickness of the clamping band 20 in the area of the clasp 52 is no more than four predetermined thicknesses 32, i.e., the thickness of the clasp 52 where it passes below the first clasp segment 38, plus the combined thicknesses of the first and second clasp segments 38 and 48 as they overlap each other, plus any additional thickness resulting from the clasp 52 passing over the second clasp segment 48.

In addition, a significant advantage of the present invention is that the inner surface of the clamping band 20 adjacent the boot 12 has a minimal degree of irregularities. As a result, the possibility is reduced that a lubricant contained within the boot 12 will leak between the boot 12 and the hub 14 due to high internal pressures or high centrifugal forces, such as that experienced by a constant velocity joint.

While the invention has been described in terms of a preferred embodiment, it is apparent that other forms could be adopted by one skilled in the art. An example is providing alternate means for securing the clamping band 20 together, in place of the clasp 52 and the pair of hooks 40 and shoulders 50. Accordingly, the scope of the invention is to be limited only by the following claims.

What is claimed is:

1. A clamping band for clamping a member to a cylindrically-shaped surface, said clamping band comprising:
   a body portion circumscribing said member, said body portion defining a diameter when circumscribing said member, said body portion having an underlap end and an oppositely disposed overlap end;
   a first clasp segment adjacent said underlap end, said first clasp segment being radially elevated above said diameter;
   hook means adjacent said first clasp segment;
   an overlap segment adjacent said overlap end, said overlap segment being radially elevated above said diameter, said overlap segment overlapping said underlap end;
   a second clasp segment disposed on said overlap segment and adjacent said overlap end, said second clasp segment overlapping said first clasp segment;
   capture means disposed on said overlap segment and adjacent said second clasp segment, said capture means engaging said hook means; and
   clasp means positioned at said first and second clasp segments, said clasp means securing said first and second clasp segments together.

2. A clamping system as claimed in claim 1, wherein said body portion has a predetermined width, and said first and second clasp segments and said underlap end each have a narrower width than said predetermined width.

3. A clamping system as claimed in claim 2, wherein said capture means comprises a pair of shoulders on opposing sides of said predetermined width, said pair of shoulders being formed where said predetermined width of said body portion adjoins said narrower width of said second clasp segment.

4. A clamping system as claimed in claim 2, wherein said hook means comprises a pair of hooks disposed on opposite sides of said narrower width of said underlap end, said pair of hooks being arcuately formed to extend radially outward from said diameter.

5. A clamping system as claimed in claim 1, wherein said clasp means comprises a clasp band which is crimped to closely fit around said first and second clasp segments.

6. A clamping band for clamping a member to a cylindrically-shaped surface, said clamping band comprising:
   a body portion circumscribing said member, said body portion defining a diameter when circumscribing said member, said body portion having a predetermined thickness, said body portion having an underlap end and an oppositely disposed overlap end;

a first clasp segment adjacent said underlap end, said first clasp segment being radially elevated above said diameter a distance of one of said predetermined thicknesses;

hook means adjacent said first clasp segment;

an overlap segment adjacent said overlap end, said overlap segment being radially elevated above said diameter one of said predetermined thicknesses, said overlap segment overlapping said underlap end;

a second clasp segment disposed on said overlap segment and adjacent said overlap end, said second clasp segment overlapping said first clasp segment;

capture means disposed on said overlap segment and adjacent said second clasp segment, said capture means engaging said hook means; and clasp means positioned at said first and second clasp segments, said clasp means securing said first and second clasp segments together, said clasp means and said first and second clasp segments having a combined thickness of no more than three of said predetermined thicknesses.

7. A clamping system as claimed in claim 6, wherein said body portion has a predetermined width and said first and second clasp segments and said underlap end each have a narrower width than said predetermined width.

8. A clamping system as claimed in claim 7, wherein said capture means comprises a pair of shoulders on opposing sides of said predetermined width, said pair of shoulders being formed where said predetermined width of said body portion adjoins said narrower width of said second clasp segment.

9. A clamping system as claimed in claim 7, wherein said hook means comprises a pair of hooks disposed on opposite sides of said narrower width of said underlap end, said pair of hooks being arcuately formed to extend radially outward from said diameter a distance of at least one of said predetermined thicknesses.

10. A clamping system as claimed in claim 6, wherein said clasp means comprises a clasp band which is crimped to closely fit substantially around said first and second clasp segments, said clasp band and said first and second clasp segments having a combined thickness of approximately four of said predetermined thicknesses.

11. A clamping band for clamping a member to a cylindrically-shaped surface, said cylindrically-shaped surface having at least one annular groove, said clamping band comprising:

a body portion adapted to circumscribe said member in said region to be clamped, said body portion defining a diameter when circumscribing said member, said body portion having a predetermined width no greater than said at least one annular groove, said body portion having a predetermined thickness, said body portion having an underlap end and an oppositely disposed overlap end, said underlap end being narrower than said predetermined width;

a first clasp segment adjacent said underlap end, said first clasp segment being narrower than said predetermined width, said first clasp segment being elevated a distance of one of said predetermined thicknesses above said diameter;

a pair of hooks interposed between said first clasp segment and said underlap end, said pair of hooks being disposed on opposite sides of said predetermined width, said pair of hooks being arcuately formed to extend a distance of at least one of said predetermined thicknesses above said diameter;

an overlap segment adjacent said overlap end, said overlap segment being elevated a distance of one of said predetermined thicknesses above said diameter, said overlap segment overlapping said underlap end;

a second clasp segment disposed on said overlap segment and adjacent said overlap end, said second clasp segment overlapping said first clasp segment, said second clasp segment having a narrower width than said predetermined width;

capture means disposed on said overlap segment and adjacent said second clasp segment, said capture means being formed so as to engage said pair of hooks; and clasp means positioned at said first and second clasp segments, said clasp means securing said first and second clasp segments together.

12. A clamping system as claimed in claim 11, wherein said capture means comprises a pair of shoulders on opposing sides of said predetermined width, said pair of shoulders being formed where said predetermined width of said body member adjoins said narrower width of said second clasp segment.

13. A clamping system as claimed in claim 11, wherein said clasp means comprises a clasp band which is crimped to closely fit around said first and second clasp segments.

14. A clamping system as claimed in claim 11, further comprising a breakaway leg extending from said overlap end, said breakaway leg facilitating the tightening of said clamping band around said member to be clamped, said breakaway leg being readily capable of breaking free of said overlap end.

15. A clamping band comprising:

a body portion, said body portion having an underlap end and an oppositely disposed overlap end;

a first clasp segment adjacent said underlap end, said first clasp segment being elevated higher than said body portion;

hook means adjacent said first clasp segment;

an overlap segment adjacent said overlap end, said overlap segment being elevated higher than said body portion;

a second clasp segment disposed on said overlap segment and adjacent said overlap end;

capture means disposed on said overlap segment and adjacent said second clasp segment, said capture means adapted for engaging said hook means; and clasp means operatively associated with said first and second clasp segments, said clasp means adapted for securing said first and second clasp segments together when said body portion is arranged to take a circular form and said second clasp segment overlaps said first clasp segment, said overlap segment overlapping said underlap end.

16. A clamping band as claimed in claim 15, wherein said body portion has a predetermined width, and said first and second clasp segments and said underlap end each have a narrower width than said predetermined width.

17. A clamping band as claimed in claim 16, wherein said capture means comprises a pair of shoulders on opposing sides of said predetermined width, said pair of shoulders being formed where said predetermined width of said body member adjoins said narrower width of said second clasp segment.

18. A clamping band as claimed in claim 16, wherein said hook means comprises a pair of hooks disposed on opposite sides of said narrower width of said underlap end, said pair of hooks being arcuately formed to extend higher than said body portion.

19. A clamping band as claimed in claim 15, wherein said clasp means comprises a clasp band which is crimped to closely fit around said first and second clasp segments.

20. A clamping band comprising:
   a body portion, said body portion having a predetermined thickness, said body portion having an underlap end and an oppositely disposed overlap end;
   a first clasp segment adjacent said underlap end, said first clasp segment being elevated a distance of one of said predetermined thicknesses in relation to said body portion;
   hook means adjacent said first clasp segment;
   an overlap segment adjacent said overlap end, said overlap segment being elevated a distance of one of said predetermined thicknesses in relation to said body portion;
   a second clasp segment disposed on said overlap segment and adjacent said overlap end;
   capture means disposed on said overlap segment and adjacent said second clasp segment, said capture means adapted for engaging said hook means; and
   a clasp operatively associated with said first and second clasp segments, said clasp securing said first and second clasp segments together when said body portion is arranged to take a circular form and said second clasp segment overlaps said first clasp segment, said overlap segment overlapping said underlap end, said clasp means and said first and second clasp segments having a combined thickness of at least three of said predetermined thicknesses.

21. A clamping band as claimed in claim 20, wherein said body portion has a predetermined width, and said first and second clasp segments and said underlap end each have a narrower width than said predetermined width.

22. A clamping band as claimed in claim 21, wherein said capture means comprises a pair of shoulders on opposing sides of said predetermined width, said pair of shoulders being formed where said predetermined width of said body portion adjoins said narrower width of said second clasp segment.

23. A clamping band as claimed in claim 21, wherein said hook means comprises a pair of hooks disposed on opposite sides of said narrower width of said underlap end, said pair of hooks being arcuately formed to extend higher than said body portion a distance of at least one predetermined thickness.

24. A clamping band as claimed in claim 20, wherein said clasp means comprises a clasp band which is adapted to be crimped to closely fit substantially around said first and second clasp segments, said clasp band and first and second clasp segments having a combined thickness of approximately four of said predetermined thicknesses.

25. A clamping band for clamping a member to a cylindrically-shaped surface having at least one annular groove in a region of said member which is to be clamped, said clamping band comprising:
   a body portion having a length greater than the circumference of said member in said region, said body portion having a predetermined width, said body portion having a predetermined thickness, said body portion having an underlap end and an oppositely disposed overlap end, said underlap end being narrower than said predetermined width;
   a first clasp segment adjacent said underlap end, said first clasp segment being narrower than said predetermined width, said first clasp segment being elevated a distance of one of said predetermined thicknesses in relation to said body portion;
   a pair of hooks interposed between said first clasp segment and said underlap end, said pair of hooks being disposed on opposite sides of said predetermined width, said pair of hooks being arcuately formed to extend a distance of at least one of said predetermined thicknesses in relation to said body portion;
   an overlap segment adjacent said overlap end, said overlap segment being elevated a distance of one of said predetermined thicknesses in relation to said body portion;
   a second clasp segment disposed on said overlap segment and adjacent said overlap end, said second clasp segment having a narrower width than said predetermined width;
   hooking means disposed on said overlap segment and adjacent said second clasp segment, said hooking means being formed so as to be engagable with said pair of hooks; and
   a clasp operatively associated with said first and second clasp segments, said clasp securing said first and second clasp segments together when said body portion is arranged to take a circular form and said second clasp segment overlaps said first clasp segment, said overlap segment overlapping said underlap end.

26. A clamping band as claimed in claim 25, wherein said hooking means comprises a pair of shoulders on opposing sides of said predetermined width, said pair of shoulders being formed where said predetermined width of said body member adjoins said narrower width of said second clasp segment.

27. A clamping band as claimed in claim 25, wherein said clasp means comprises a clasp band which is crimped to closely fit around said first and second clasp segments.

28. A clamping band as claimed in claim 25, further comprising a breakaway leg extending from said overlap end, said breakaway leg facilitating the tightening of said clamping band around said member to be clamped, said breakaway leg being readily capable of breaking free of said overlap end.

* * * * *